United States Patent
Smythe, Jr.

(10) Patent No.: US 8,393,376 B2
(45) Date of Patent: *Mar. 12, 2013

(54) DRYWALL TRIM AUTO-FOLDER, MASTIC APPLICATOR AND CUTTER

(76) Inventor: Timothy Smythe, Jr., Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/151,002

(22) Filed: Jun. 1, 2011

(65) Prior Publication Data

US 2012/0132341 A1    May 31, 2012

Related U.S. Application Data

(62) Division of application No. 11/633,086, filed on Nov. 30, 2006, now Pat. No. 7,958,923.

(60) Provisional application No. 60/742,797, filed on Dec. 6, 2005.

(51) Int. Cl.
*B44C 7/04* (2006.01)
*E04B 2/00* (2006.01)

(52) U.S. Cl. ........ 156/526; 156/575; 156/578; 156/579; 427/208.4; 427/293

(58) Field of Classification Search .................. 156/526, 156/574, 575, 577, 578, 579; 427/207.1, 427/208.4, 208.6, 293, 434.2
See application file for complete search history.

(56) References Cited

U.S. PATENT DOCUMENTS

| | | | |
|---|---|---|---|
| 2,400,698 A | 5/1946 | Lissa | |
| 3,178,978 A * | 4/1965 | Eisenman | 83/208 |
| 3,392,895 A * | 7/1968 | Ellner et al. | 226/138 |
| 3,435,251 A * | 3/1969 | Ellner | 307/115 |
| 3,496,698 A | 2/1970 | Wichmann | |
| 3,558,030 A * | 1/1971 | Hempel et al. | 226/135 |
| 3,750,728 A | 8/1973 | Stark | |
| 4,127,434 A * | 11/1978 | Lass | 156/526 |
| 4,652,331 A * | 3/1987 | Plasencia | 156/526 |
| 5,730,819 A * | 3/1998 | Retti | 156/71 |
| 6,449,855 B1 * | 9/2002 | Louis | 33/286 |
| 6,565,252 B2 * | 5/2003 | Dillinger et al. | 366/13 |

OTHER PUBLICATIONS

PCT Preliminary Report on Patentability for parent application PCT/US07/024420 Jun. 11, 2009.

* cited by examiner

*Primary Examiner* — Mark A Osele
(74) *Attorney, Agent, or Firm* — Clifford Kraft

(57) ABSTRACT

A drywall trim application device that can hold a large role of drywall flex corner trim material and, as the material is being dispensed, pre-crease or form the material for use on an inside or outside corner, or any angle within the range of the trim material, apply a mastic material (drywall mud, adhesive or any other bonding medium) to the flex trim material, and cut the material at any desired length automatically. Measurements may be either input by hand or downloaded from an electronic measurement tool into this device. This invention can generally store multiple measurements such as length and angles, measure the length of flex trim material as it is dispensed from the device, crease the material, apply predetermined amount of mastic, and automatically cut the flex trim material to each length previously input.

8 Claims, 4 Drawing Sheets

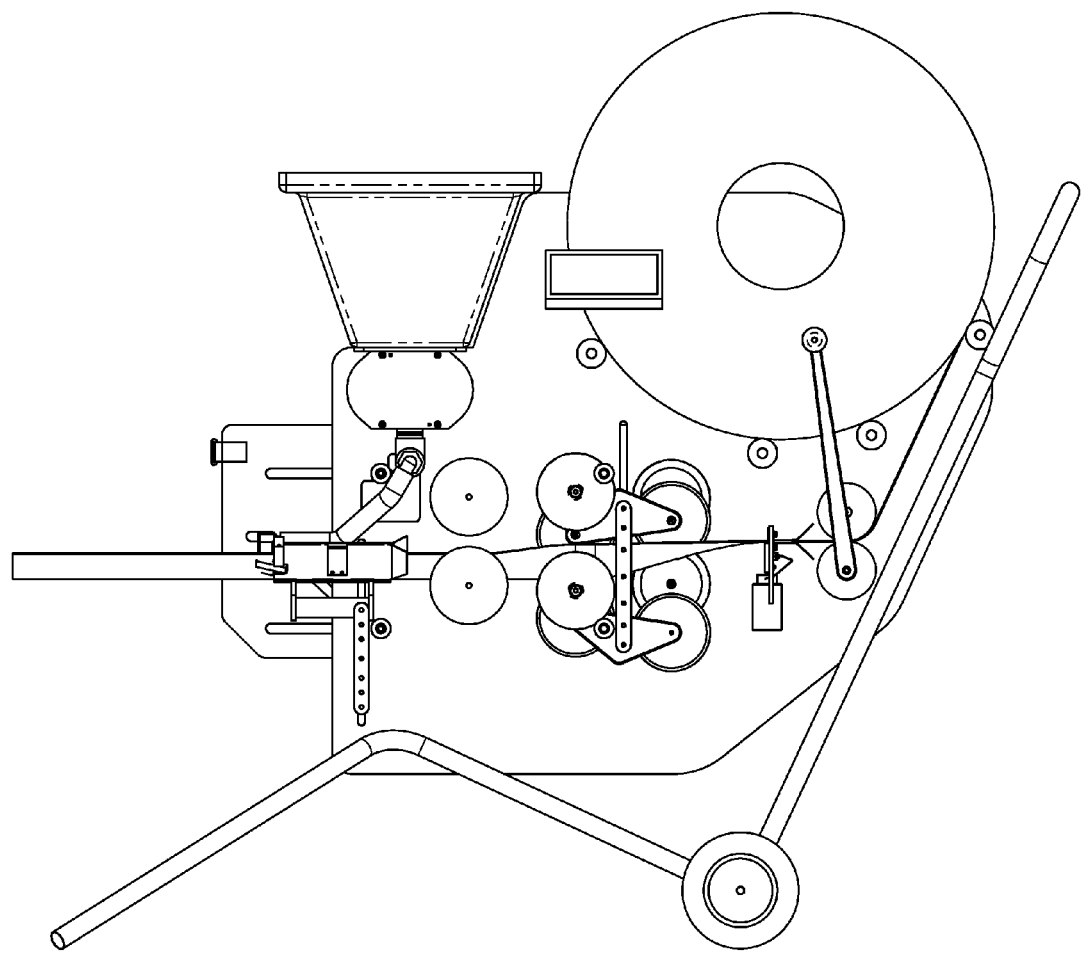
FUGURE 4

DRYWALL TRIM AUTO-FOLDER, MASTIC APPLICATOR AND CUTTER

This is a divisional application of co-pending application Ser. No. 11/633,086 filed Nov. 30, 2006. That application was related to and claimed priority from U.S. Provisional Patent application No. 60/742,797 filed Dec. 6, 2005. Application Ser. Nos. 11/633,086 and 60/742,797 are hereby incorporated by reference.

BACKGROUND

1. Field of the Invention

The present invention relates generally to the field of drywall corner trim application and more particularly to a device that will hold a large roll of drywall flex corner trim material and, as the material is being dispensed, pre-crease the material for use on an inside or outside corner, apply a mastic material, adhesive, or adhesive activation material and cut the material at any desired length.

2. Description of the Prior Art

It is known in the industry to use various outside, inside and flex corner trim materials in finishing sheet rocked walls (drywall). These various materials have specific purposes such as for an inside corner or an outside corner, or they can be flexed by hand to cover various corner angles (off angles). This requires the installer to purchase, stock, and carry each of these different products, in various lengths, with them from job to job.

In using all of these different corner trim materials the installer has to apply a mastic material, usually drywall mud, some adhesive or some adhesive activation material such as water for water activated adhesives, to the corner prior to applying the trim material, or otherwise mechanically fasten it into place either with nails, staples, screws or otherwise. This is usually done by hand with various tools. All of these materials must also be cut to length, usually by hand, during installation at the job site which creates much wasted corner trim material.

It would be advantageous to have a device that will do many or all of these operations automatically at the time of installation making the installers work easier, faster, more efficient and with less waste material.

SUMMARY OF THE INVENTION

The present invention relates to a device that can hold a large roll (possible 500 feet of material or more) of drywall flex corner trim material and, as the material is being dispensed, pre-crease or form the material for use on an inside or outside corner, or any angle within the range of the trim material, apply a mastic material (drywall mud, adhesive or any other bonding medium) to the flex trim material, and cut the material at any desired length automatically. Measurements may be either input by hand or downloaded from an electronic measurement tool into this device. This invention can generally store multiple measurements such as length and angles, measure the length of flex trim material as it is dispensed from the device, crease the material, apply predetermined amount of mastic, and automatically cut the flex trim material to each length previously input. The user is then free to apply one piece of flex trim material after another to multiple drywall corners on a job site. Moving the flex trim material through the device may be powered by hand, pulling the flex trim material out, or powered by electric motors so all the user needs to do is support the flex trim material as it comes out of the device.

DESCRIPTION OF THE FIGURES

Attention is now directed to several illustrations:

FIG. 4 shows an embodiment of the invention configured to form the flex trim material for application to an outside corner on the job site.

Several drawings and illustrations have been presented to aid in the understanding of the present invention. The scope of the present invention is not limited to what is shown in the figures.

DESCRIPTION OF THE INVENTION

Figure 1:
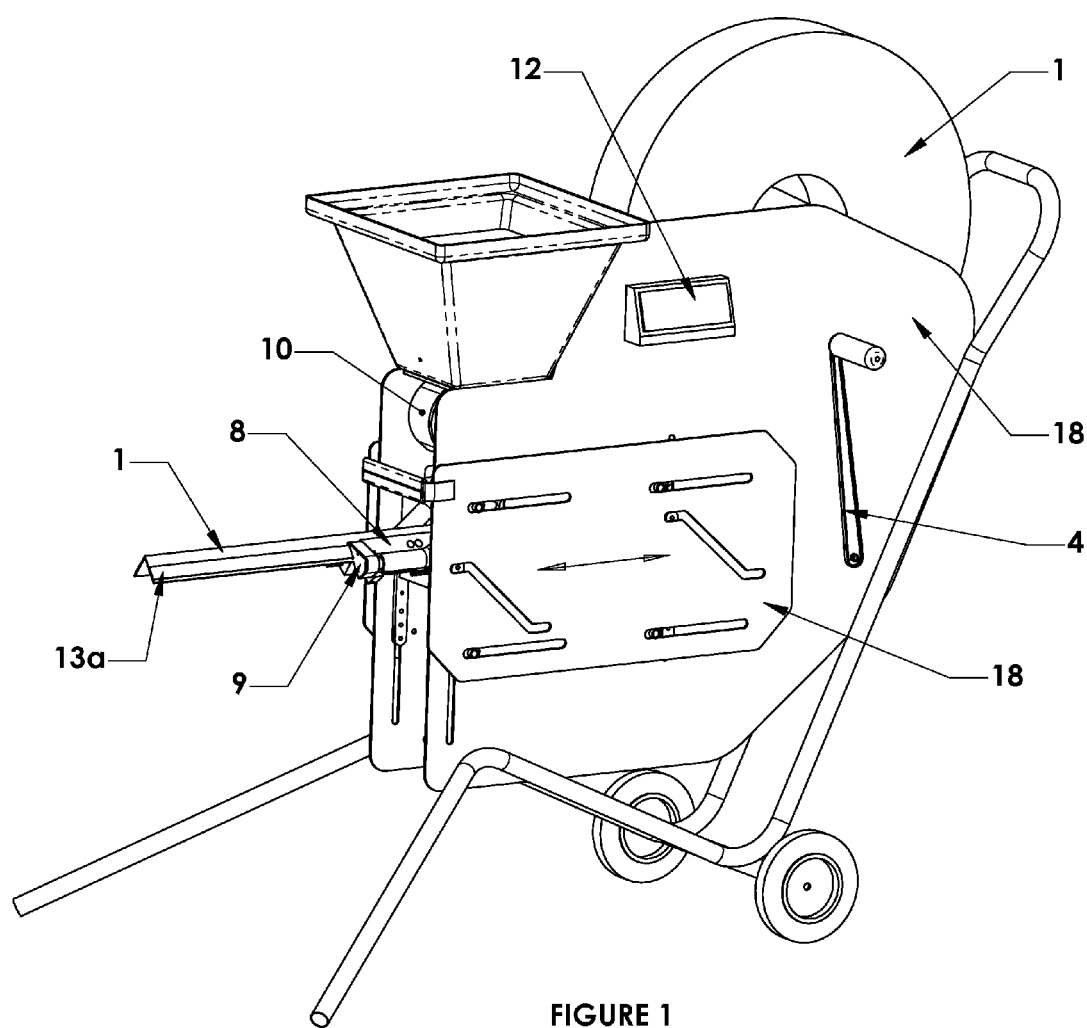
FIG. 1 shows a right side view of an embodiment of the present invention.

Turning to FIG. 1, the right side view of the an embodiment of the present invention can be seen. A large roll of trim material (1) can be held in the device so it can rotate freely as the material is fed off the roll and moved through the machine. The material is routed to a set of rollers attached to the advance lever (4). Rotating the advance lever (4) rotates these internal rollers which pull the trim material (1) off the large roll and feed it further into the machine. A cam assembly (18) can be moved left or right in this figure to adjust the position of the folder frame (20) to set the angle to which the trim material (1) will be folded, or pre-creased, as it is moved through the device. A pump (10) and applicator (9) assembly applies a mastic to the trim material (1), measures & cuts to the trim material (1) to length, and the user places it onto the drywall corner. The cam assembly (18) may be replaced by any mechanical means to locate the folder frame (20) such as air, or electrical actuators. Also visible in FIG. 1 is a mastic applicator guide (8) and the mastic applicator (9). The end of the trim material (1) can be seen as it exits the device. Note that it is folded (or creased) and mastic material Beads (13a) have been applied to the trim material (1) for application onto an inside corner. A control unit (12) can be seen mounted to the side of the device. This control unit (12) can act as an input/output device for the user, measure the length of trim material (1) moving through the device, power and activate the cutter (5) as determined by the input measurements, and it may power and control the mastic pump (10) and drive wheels (2,3) if they are motor driven. A cam assembly (18) can also be seen.

Figure 2:
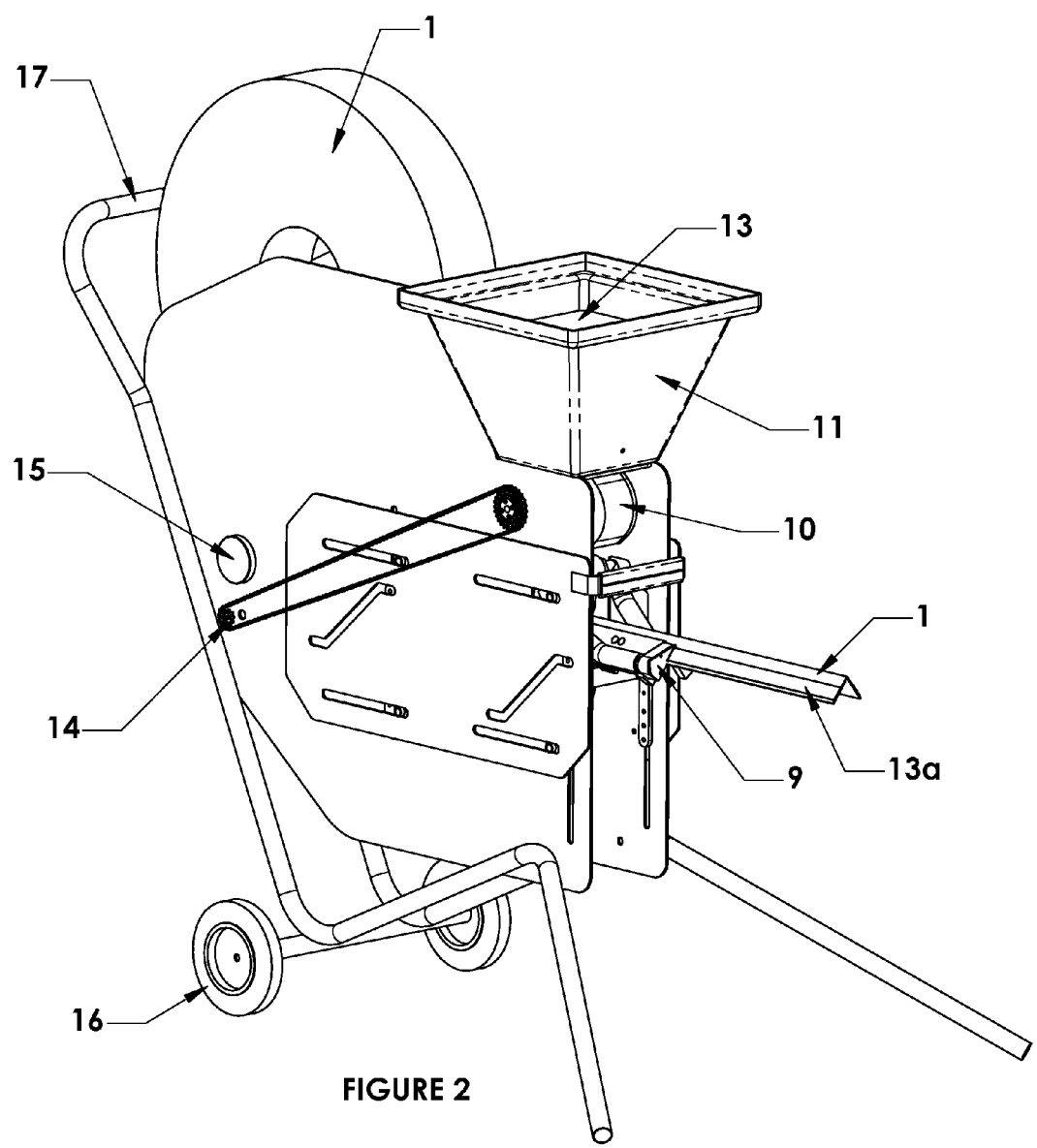
FIG. 2 shows a left side view of the embodiment of FIG. 1.

FIG. 2 view shows a left side view of the embodiment of FIG. 1. A Reservoir (11) normally sits on top of the mastic pump (10). The Reservoir (11) can be filled with, and supply the mastic pump (10) with, the mastic material (13). The mastic pump (10) normally meters and pumps the mastic material (13) to mastic applicators (9). The mastic pump (10) may be mechanically driven by a sprocket and chain arraignment (14), as shown, or by an electric motor controlled and powered by the control unit (12), not shown. A encoder (15), which can be driven by rollers riding against the flex trim material (1) as it moves through the device, can be used in conjunction with the control unit (12) to measure the length of the trim material (1) that has moved through the device and the speed with which it is moving through the device. Any method of measuring the length and/or speed of the material is within the scope of the present invention. The control unit (12) can use this information to determine when to cut the trim material (1) to produce pieces of trim material (1) the desired length, and optionally control and drive the mastic pump (10) with an electric motor so as to apply the same size of mastic bead (13*a*) to the trim product (1) regardless of how fast the trim material (1) is moving through the device. The control unit can also, optionally, to control and drive the bottom drive roller (3) using a motor. Also shown in FIG. 2 are wheels (16) and a handle (17) used to easily move the device around the job site or from site to site.

Figure 3:
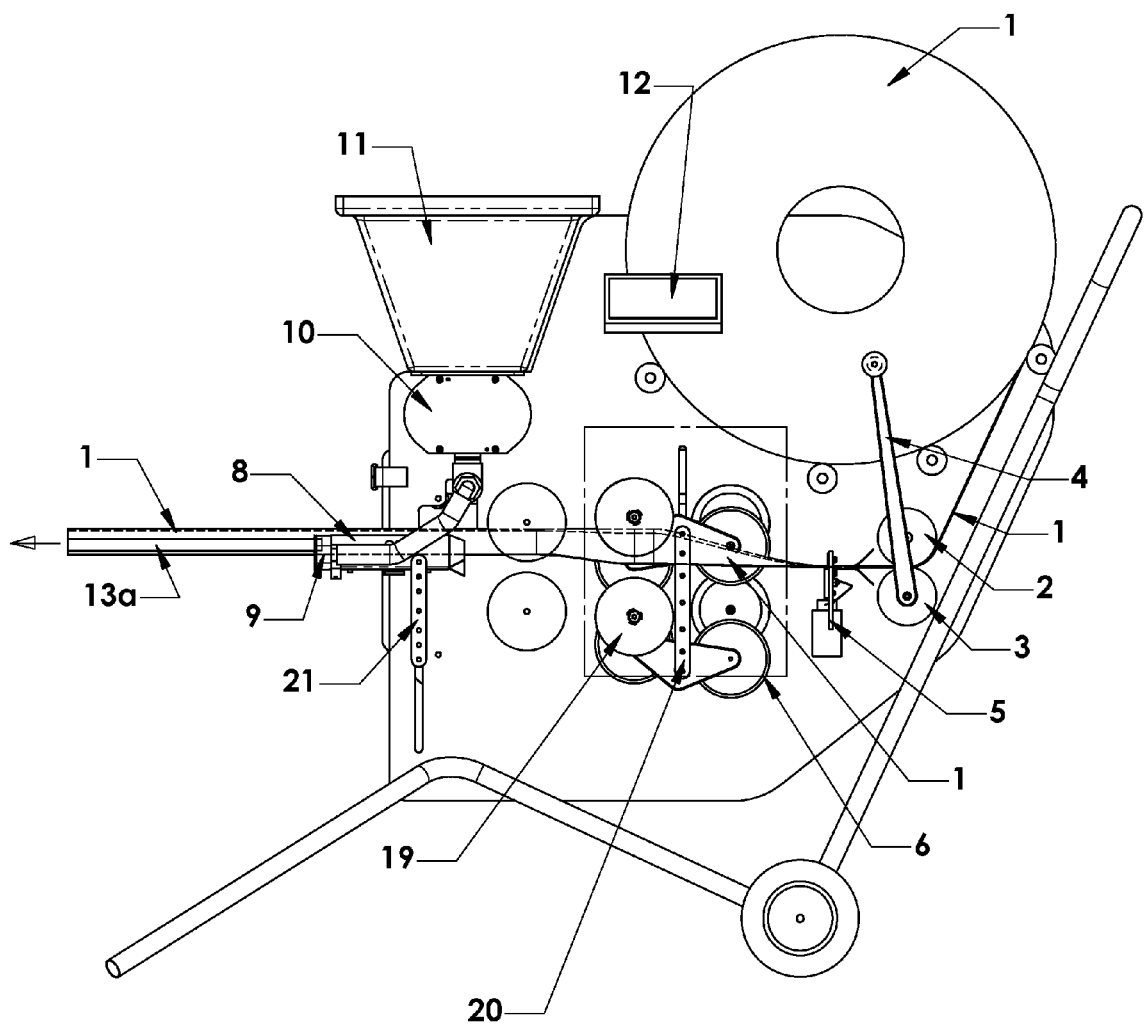
FIG. 3 shows an embodiment of the invention configured to form the flex trim material for application to an inside corner on the job site.

FIG. 3 shows a right side view of an embodiment of the present invention with the cam assembly (18) and part of the guide wheels (19) removed so that the internal parts of this embodiment of the device may be seen. Generally, in this view, the product moves from right to left through the device as it is being dispensed as indicated by the arrow on the left side of the view. The bottom drive roller (3) is normally mechanically linked to the advance lever (4) such that when the advance lever (4) is rotated counter clockwise it mechanically engages the bottom drive roller (3) to rotate in the same direction. When the advance lever (4) rotates clockwise the bottom drive roller (3) is mechanically disengaged and free to continue rotating in the counterclockwise direction. The top drive roller (2) is normally directly above the bottom drive roller (3) in such a way that the two rollers push against each other. The bottom drive roller (3) may be driven by an electric motor and controlled by the control unit (12).

The trim material (1) can be routed between the top drive roller (2) and the bottom drive roller (3) and is normally forced by friction to move in the direction the rollers are rotated. When the advance lever (4) is rotated counter clockwise, the trim material (1) is pulled off of the large roll and forced through the cutter (5) and into the folder (6).

The folder (6) is an arrangement of guide wheels (19) which can be mounted on a folder frame (20). The folder frame (20) can be mechanically linked to the cam assembly (18) such that when the cam assembly (18) is moved left or right the folder frame (20) is forced up or down. The up and down movement of the folder frame (20) positions the guide wheels (19) so that as the trim material (1) moves through the folder (6) and the guide wheels (19) will fold the trim material (1). The position of the guide wheels (19) generally determines the angle to which the trim material (1) is folded.

As the trim material (1) proceeds right to left through the folder (6), and is folded, it exits the folder (6) and moves past a upper guide roller (7A) or lower guide roller (7B) depending on whether the trim material (1) is being folded to an inside or outside angle respectively. These guide rollers (7) guide the trim material (1) into a mastic applicator guide (8). The mastic applicator guide (8) normally has a left and right side and hinges at the center and is attached to the mastic applicator guide frame (21). The mastic applicator guide frame (21) is normally mechanically linked to the cam assembly (18) and moves with the folder frame (20) as the cam assembly (18) is moved left or right. This mechanical action may be achieved by any alternate means for example air or hydraulic cylinders.

The mastic applicator guide (8) guides the folded flex trim material (1) past the mastic applicators (9). The mastic applicators (9) are attached to the applicator guide (8) and therefore are normally positioned properly to apply mastic bead (13*a*) to the trim material (1) regardless of what angle the trim material (1) is being folded at. There is normally one mastic applicator (9) on each side of the trim material (1). As the trim material (1) is dispensed (to the left in this view) two mastic beads (13*a*) of mastic material (13) are applied to it. One bead (13*a*) of mastic material (13) can be applied to each side of the trim material (1).

The rate of flow of mastic material (13) out of the mastic applicators (9) is normally determined by how fast the mastic pump (10) rotates, which is determined by how fast the trim material (1) is moving through the device. In this way, the same size of mastic bead (13*a*) is applied to the trim material (1) regardless of how fast the trim material (1) is moving through the device. This results in an exact amount of mastic material (13) being applied to the trim material (1) so there is very little cleanup or waste.

FIG. 3 shows the device adjusted to form the flex trim material for application to an inside corner on the job site.

FIG. 4 shows the device adjusted to form the flex trim material for application to an outside corner on the job site.

Several descriptions and illustrations have been provided to better aid in understanding the present invention. One skilled in the art will realize that there are numerous changes and variations possible without departing from the spirit of the invention. Each of these changes and variations is within the scope of the present invention.

The invention claimed is:

1. A method of dispensing drywall trim for use in construction comprising the steps of: providing a apparatus comprising: a drywall trim roll; a feed mechanism coupled to the drywall trim roll, wherein said feed mechanism pulls drywall trim from said roll; a folder mechanism adapted to fold or crease said drywall trim longitudinally; a mastic applicator adapted to coat at least one side of said trim with mastic; and a cutter that cuts said trim to a predetermined length; entering at least one length value into said apparatus; entering at least one angle value into said apparatus; causing said apparatus to feed a length of drywall trim from said roll, crease said drywall trim to said angle value, coat at least one side of said drywall trim with mastic, cut said drywall trim to said length value and dispense said cut drywall trim for installation.

2. The method of claim 1 wherein said apparatus can apply drywall joint compound, adhesives, or a medium that activates an adhesive already present on the surface of the drywall trim.

3. The method of claim 1 wherein said apparatus can store multiple measurements and angles.

4. The method of claim 1 wherein said apparatus can dispense a piece of folded, coated and measured trim material automatically or on command.

5. The method of claim 1 wherein said apparatus can dispense a piece of folded, coated and measured trim material in a manual mode.

6. The method of claim 1 wherein measurements may be either input by hand or downloaded from an electronic measurement tool into said apparatus.

7. The method of claim 1 wherein measurements can be wirelessly downloaded from an electronic measurement tool into said apparatus.

8. The method of claim 1 wherein measurements can be downloaded by wire from an electronic measurement tool into said apparatus.

* * * * *